Nov. 13, 1934.   F. X. GRASER   1,980,915
MOTION PICTURE CAMERA
Filed Nov. 19, 1932   4 Sheets-Sheet 1

WITNESSES
Edw. Thorpe
Hugh H. Ott

INVENTOR
Frank X. Graser
Munn & Co.
ATTORNEY

Nov. 13, 1934. F. X. GRASER 1,980,915
MOTION PICTURE CAMERA
Filed Nov. 19, 1932 4 Sheets-Sheet 2

WITNESSES
Edw. Thorpe
Hugh H. Ott

INVENTOR
Frank X. Graser
BY
ATTORNEY

Nov. 13, 1934.  F. X. GRASER  1,980,915
MOTION PICTURE CAMERA
Filed Nov. 19, 1932  4 Sheets-Sheet 3

WITNESSES
Edw. Thorpe
Hug H. Ott

INVENTOR
Frank X. Graser
BY
Munn & Co.
ATTORNEY

Nov. 13, 1934.  F. X. GRASER  1,980,915
MOTION PICTURE CAMERA
Filed Nov. 19, 1932  4 Sheets-Sheet 4

WITNESSES
Edw. Thorpe
Hugh H. Ott

INVENTOR
Frank X. Graser
BY
Munn & Co.
ATTORNEY

UNITED STATES PATENT OFFICE 1,980,915

MOTION PICTURE CAMERA

Frank X. Graser, Lindenhurst, N. Y.

Application November 19, 1932, Serial No. 643,461

4 Claims. (Cl. 88—16.6)

This invention relates to motion picture cameras, and comprehends a film handling and exposing mechanism therefor, by virtue of which the exposures may be made while the film is continuously fed or moved through the camera, as distinguished from the usual practice of intermittently moving the film so that exposures are made while the film is at rest.

The invention further and more particularly resides in an improved stereoscopic motion picture camera for alternately exposing through spaced lenses to a continuously moving sensitized film, the objects being photographed, so as to record on alternate frames of the film the pictures which are taken by the spaced lenses, whereby subsequent projection of the film by a stereoscopic projector will produce the stereoscopic effect.

The invention further resides in a film handling and exposing mechanism for motion picture cameras, means for reflecting the image from a lens onto a moving film, which means includes a fixed reflector and a moving reflector coacting therewith, and which moving reflector has a speed coinciding with the speed of movement of the film, to obviate the necessity of stopping the film when the exposure is being made.

The invention further embodies means for so supporting and guiding that portion of the film which is being exposed to the reflections cast thereon by the movable reflector, as to prevent distortion in the registering of the images or objects on the film.

The invention further comprehends in connection with a stereoscopic camera, a means for guiding and mounting the portion of the film which is being exposed, whereby it may be alternately shifted to receive the reflections of the image from the alternate lenses.

The invention contemplates further the provision of means for effecting adjustments in the focal length of the lenses and the angularity of the fixed reflectors.

The invention further resides in the provision of driving mechanism for imparting properly synchronized motion to the several moving parts of the camera.

Other objects of the invention reside in the comparative simplicity of construction, the economy with which the camera may be produced and the general efficiency derived therefrom.

With the above recited and other objects in view, reference is made to the following specification and accompanying drawings, in which there are illustrated several forms of the invention, while the claims mark out and define the actual scope thereof.

Figure 1:
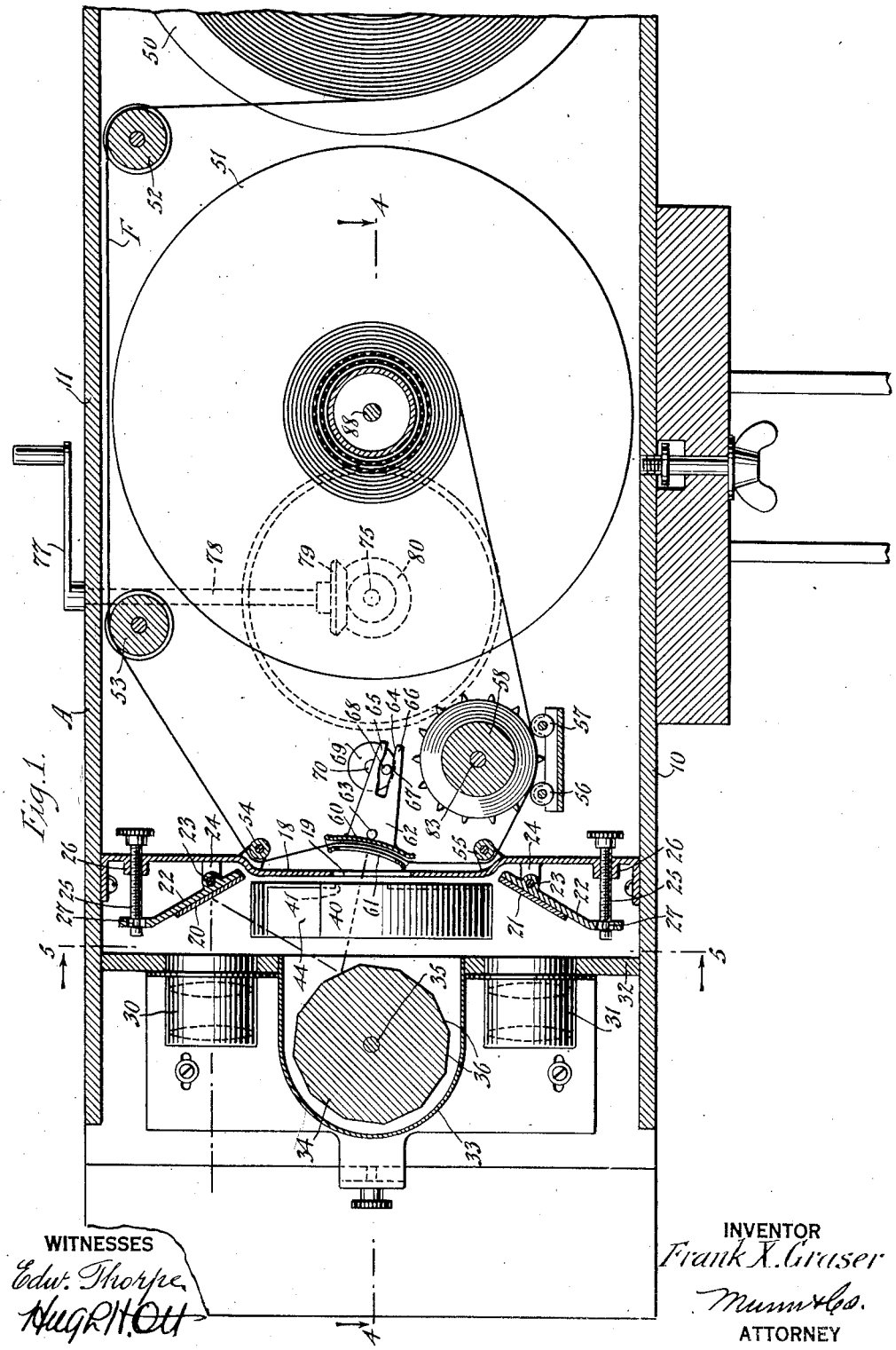
Figure 1 is a fragmentary longitudinal vertical sectional view through a stereoscopic camera constructed in accordance with the invention.
Figure 2:
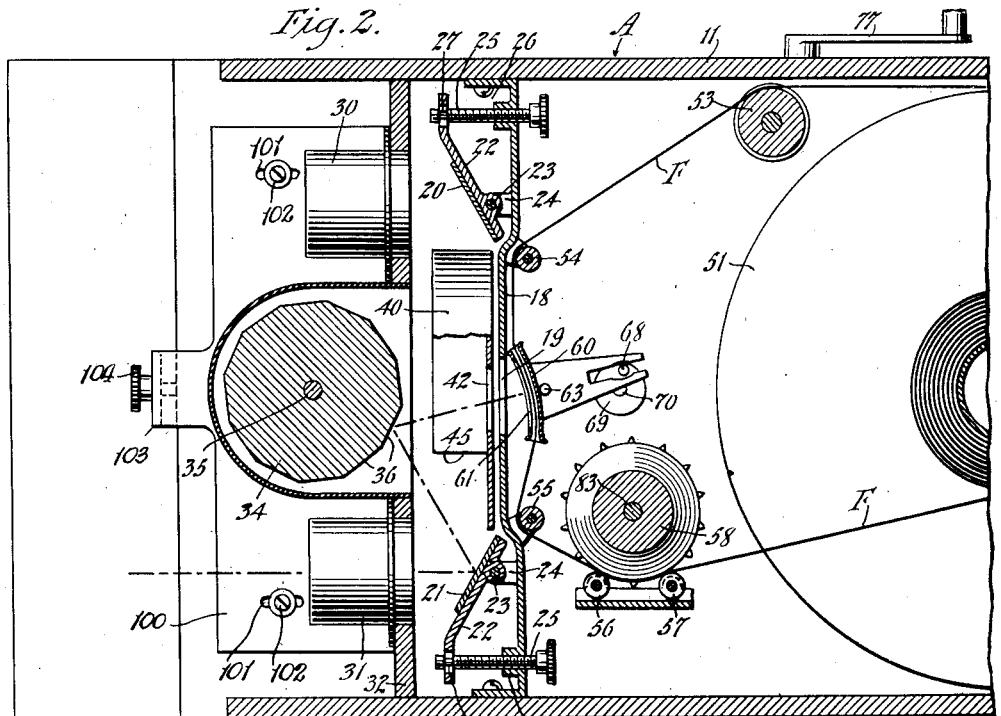
Figure 2 is a similar view illustrating the film guide rocked or shifted for exposing the image received through the opposite lens from that shown in Figure 1.
Figure 3:
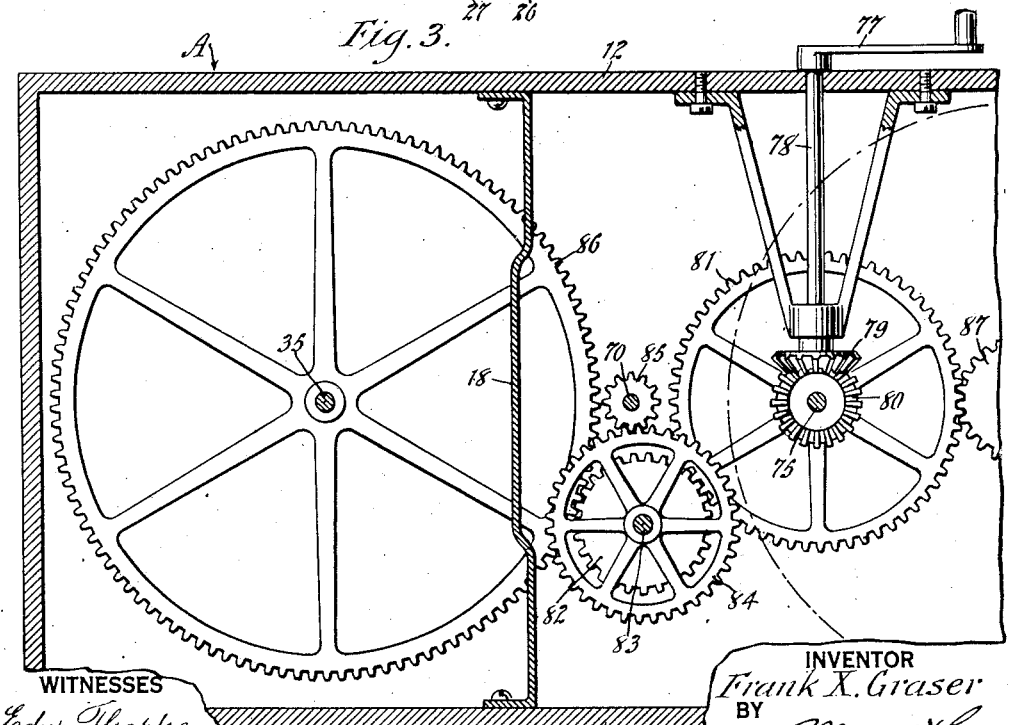
Figure 3 is a fragmentary longitudinal sectional view taken approximately on a plane indicated by the line 3—3 in Figure 4, and particularly illustrating the driving mechanism.

Referring to the drawings by characters of reference, and particularly to the form of the invention illustrated in Figures 1 to 6, inclusive, A designates generally the body or casing of the camera, in which for the purpose of convenience 10 is designated as the bottom wall, 11 the top wall, 12 one side wall and 13 the other side wall. The casing or body A is subdivided transversely by a vertically disposed longitudinally extending partition 14 defining laterally spaced compartments 15 and 16, the former of which will be hereinafter termed the gear housing compartment and the latter the film chamber. The gear housing compartment 15 is closed at its forward end by a front wall 17. A transverse partition 18 extends completely across the width and height of the body or casing A and is spaced rearwardly from the front wall 17. The transverse partition 18 closes the front of the film chamber 16 and is provided with an aperture 19 centrally of the film compartment. A pair of vertically spaced upper and lower fixed reflectors 20 and 21 are supported by the transverse partition 18. Each reflector is carried by a support 22 which is fulcrumed at 23 on a bearing 24 on the partition 18, so that the angularity of the fixed reflector may be varied or adjusted. In order to provide means for effecting the adjustments and retaining the reflectors in adjusted position, a screw 25 is threaded through a bossed partition 26 of the partition 18 and has a swiveled connection 27 with the reflector support 22.

Upper and lower lenses 30 and 31 are provided to cooperate respectively with the upper and lower reflectors 20 and 21, and said lenses are carried by a movable supporting panel 32 which is adjustable forwardly and rearwardly with reference to the camera body to vary the focal length of the lenses and focus the same, a sliding plate 100 having slots 101 therein and secured to the camera casing 102 projecting through the slots 101 so as to allow the plate a limited movement. This plate 100 is connected to the lens barrels 30 and 31 and is provided with an offset portion 103 having a set screw 104 therein engaging a fixed part of the camera frame or casing so that when this set screw is adjusted the lens barrels will be adjusted longitudinally to vary the focus of the lens. The movable supporting panel is provided with a forwardly offset hood 33 which covers a rotary reflector 34 secured to a shaft 35 which extends through the partition 14. The rotary reflector 34 is provided with a multiplicity of angulated reflecting faces 36, twelve being shown in the present instance, and adjacent faces are disposed at an angle of thirty degrees to each other. It thus follows that the images reflected by the fixed reflectors 20 or 21 will be reflected by the reflecting faces 36 of the rotary reflector 34 through the aperture 19 in the transverse partition 18 of the film chamber when the faces 36 are in a predetermined relation to the fixed reflectors.

In order to permit of and cut off the reflections at predetermined periods, a rotary shutter 40 is provided, which is preferably circular or disk shaped, having diametrically disposed openings 41 and 42 and having a forwardly directed annular rim 43 at its margin which is provided with notches or cut-outs 44 and 45. The shutter is secured to a shaft 46 which extends longitudinally of the camera body or casing and is directed rearwardly from the shutter through an opening 47 in the transverse partition 18.

The film handling mechanism which is disposed within the film chamber includes the supply reel 50 for the unexposed film and the receiving reel 51 for the exposed film, together with the film guide rollers 52, 53, 54, 55, 56 and 57 and the film sprocket 58 with which the guide rollers 56 and 57 cooperate. The guide rollers 54 and 55 are carried by the transverse partition and disposed above and below the film aperture 19.

Due to the fact that images or objects to be photographically registered on the film F are to be taken alternately through the two lenses 30 and 31 whereby the exposures will be made on alternate frames or areas of the film, it is necessary to provide shiftable means for supporting and guiding the film adjacent the aperture 19, so that the portion or frame of the film being exposed will be disposed in one position when the one lens is active and in the other position when the other lens is active. This supporting and guiding means includes a rockable guide frame 60 which is arcuate and concavo-convex, with the concave side disposed toward the aperture 19 and the convex side disposed rearwardly, the concave side having a framing opening 61. The frame has a rearwardly directed arm 62 which is fulcrumed on a bearing stud 63. The arm 62 is slotted inwardly from its rear end as at 64 to provide a pair of furcations 65 and 66, the inner confronting parallel sides of which furcations are formed intermediate their length with a concave arcuate notch 67. A crank pin 68 cooperates with the slotted portion of the arm 64 and with the inner confronting parallel sides of the furcations and the arcuate notches 67 thereof, to impart a rocking motion to the arm 62 and the rockable film guide frame 60, so that the frame upon each complete turn of the crank pin is rocked from one position to the other and back to its former position while held stationary for a predetermined period between each rocking movement while the crank pin 68 is passing over and engaging with the arcuate notches 67. The crank pin 68 is carried by and protrudes eccentrically from a head 69, which head is secured to a transverse shaft 70 extending through the partition 14. The shutter shaft 46 is provided with a miter gear 71 which meshes with and is driven by a miter pinion 72 keyed on the shaft 70, whereby the shutter 40 makes one complete revolution upon each revolution of the shaft 70 and each complete turn of the crank pin 68.

The driving mechanism or gearing includes a main drive shaft 75 which extends inwardly through the side wall 12 and is journaled at its inner end in the partition 14, the outer exposed end 76 of the drive shaft being so shaped as to receive thereover a crank handle 77 for turning the shaft. The shaft may also be optionally driven by a right angularly disposed crank shaft 78, which is connected thereto by bevel gears 79 and 80, the crank shaft 78 extending through the upper wall 11 and being formed with an externally disposed extremity shaped to receive the crank handle 77. The drive shaft 75 has keyed thereon a main driving gear 81 which is located within the gear housing compartment 15. The main driving gear 81 meshes with a gear 82 of materially reduced ratio which is keyed on a countershaft 83 journaled in the walls 12 and partition 14 and extending through the partition 14 into the film chamber 16. The countershaft 83 has secured on its outer end the film sprocket 58 which is disposed within the film chamber 16, and said counter shaft has secured thereon a gear 84 disposed within the gear housing compartment 15 which meshes with and drives the pinion 85 on the shaft 70. The gear 82 meshes with and drives the gear 86 which is secured to the shaft 35. The main driving gear 81 also meshes with a gear 87 secured to the shaft 88, upon which the film receiving reel 51 is mounted, and which reel is coupled to the shaft for turning movement therewith by the usual form of friction means which allows for slippage of the reel with respect to the shaft to compensate for the increase in the diameter of the film convolutions as they are wound on the reel.

Figure 4:
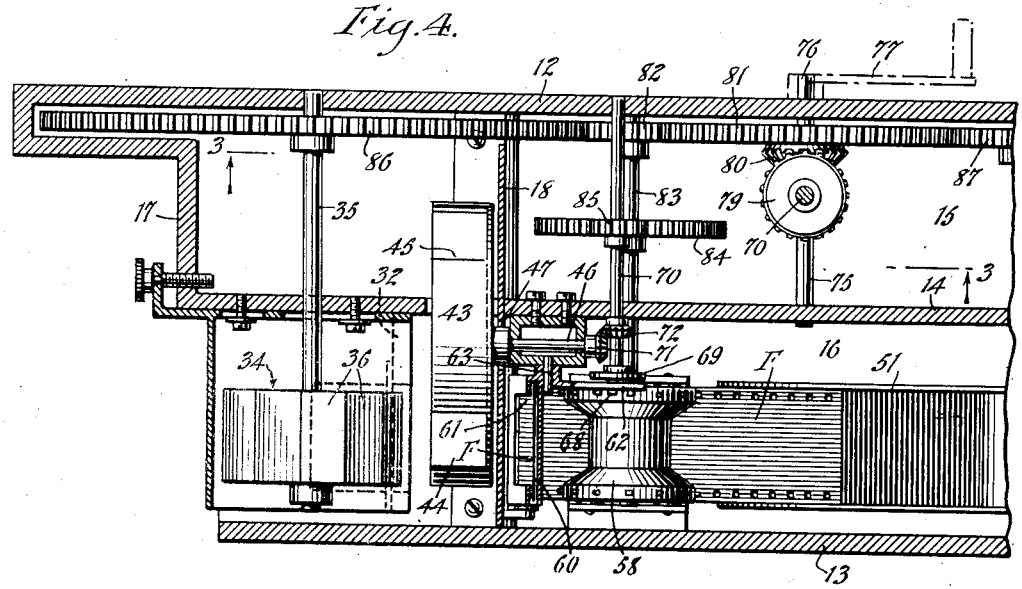
Figure 4 is a sectional view taken approximately on a plane indicated by the line 4—4 in Figure 1.
Figure 5:
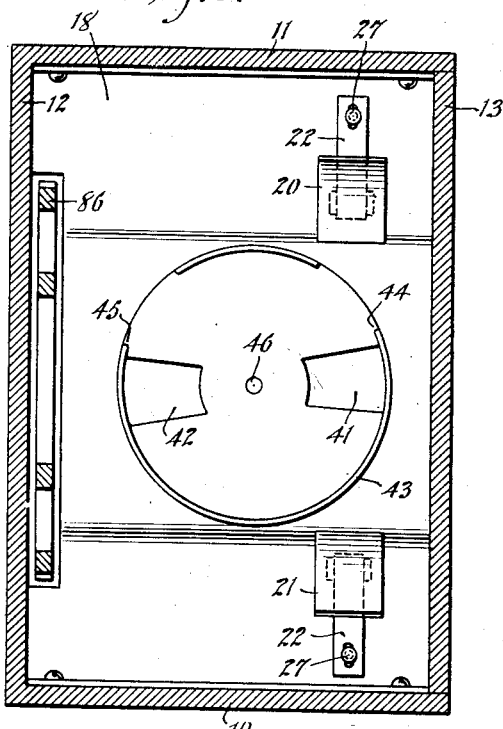
Figure 5 is a transverse sectional view taken approximately on the line indicated at 5—5 in Figure 1.
Figure 6:
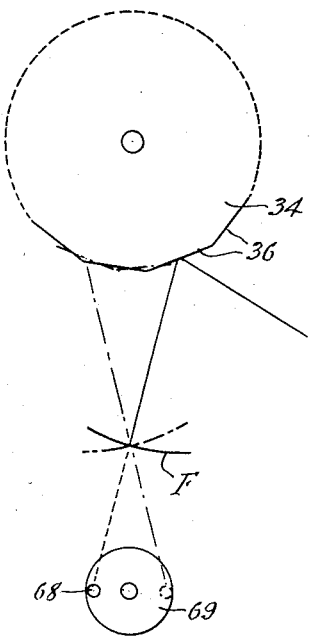
Figure 6 is a diagrammatic view illustrating the successive positions of the rotary reflector and the rockable film guiding frame.

In operation, with the parts in the position shown in Figures 1, 4 and 5, the upper lens 30 is effective to focus the image on the upper fixed reflector 20, from which the image is reflected through the notch or cut-out 44 of the shutter to one of the faces 36 of the rotary reflector 34. At this point, the shutter opening 41 is registering with the aperture 19 so that the image reflected onto the face 36 from the fixed reflector 20 is reflected by said face 36 onto the area or frame of the film which is moving through the rockable guide frame 60. Due to the gearing, the frame F is moving at a speed coincident with the speed of movement of the rotary reflector, and this coinciding means permits of the exposure and taking of the picture while the film is in motion and without the necessity of stopping the same. As soon as the exposure on the particular frame or film area has been completed, the shutter 40 intercepts and cuts off the light until the shutter opening 42 registers with the aperture 19, at which time the notch or cutout 45 is in a position to permit the image focused by the lower lens 31 to be reflected by the lower focused reflector 21 onto a face 36 of the rotary reflector, from whence it is reflected through the shutter opening 42 and aperture 19 onto the succeeding frame or area of the film, which succeeding area or frame has been brought into proper position to receive the exposure by the shifting or rocking of the rockable guide frame 60 from the position shown in Figure 1 to the position shown in Figure 2. It will thus be observed that the film while moving continuously has photographically registered on its successive frame areas, the images which are focused through the upper and lower lenses.

Figure 7:
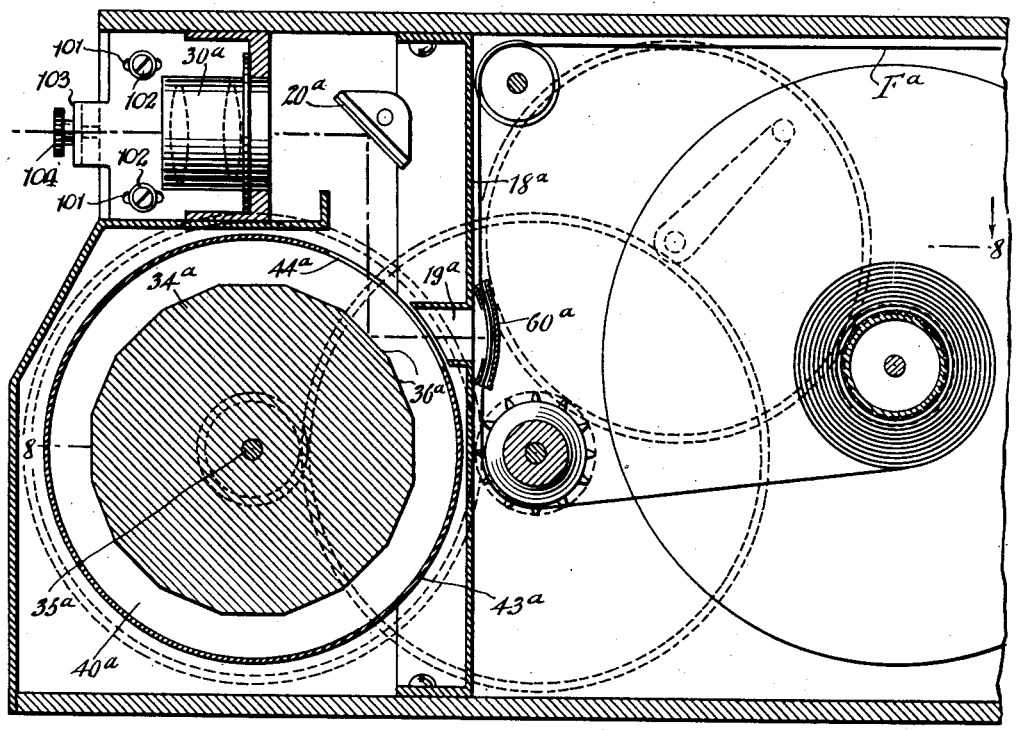
Figure 7 is a fragmentary longitudinal sectional view of a single lens camera constructed in accordance with the invention, taken approximately on the line 7—7 in Figure 8.
Figure 8:
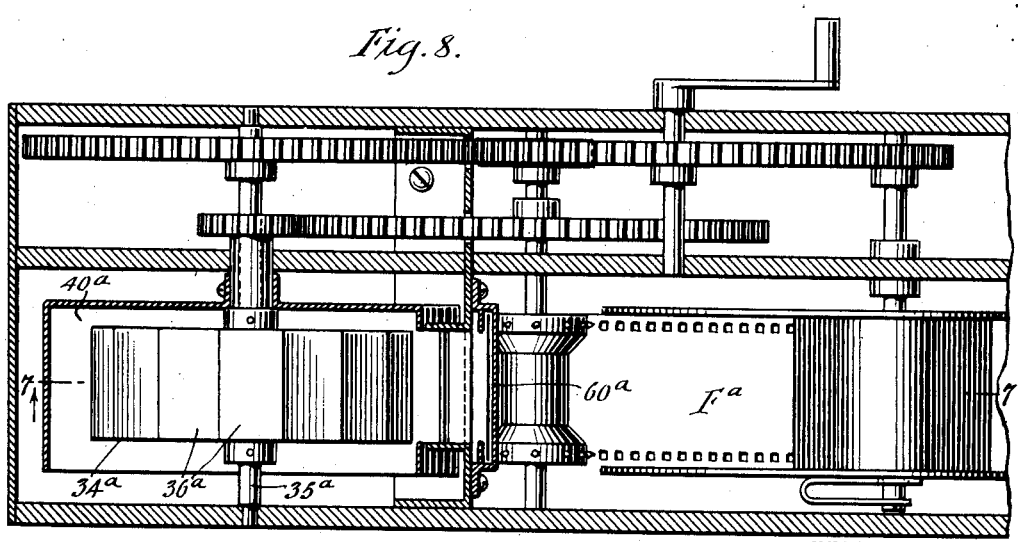
Figure 8 is a sectional view taken approximately on the line 8—8 in Figure 7.

In the form of the invention illustrated in Figures 7 and 8, a single lens camera is disclosed which employs the same principle of a continuously moving film as used in connection with the stereoscopic camera previously described. In this instance, however, the film guide frame 60a is fixed with reference to the aperture 19a in the wall or partition 18a and the image focused by the single lens 30a is reflected by a fixed adjustable reflector 20a onto one of the faces 36a of a rotary reflector 34a through a single notch or cutout 44a on the annular rim 43a of a shutter 40a which is mounted so that the rim is concentric to the axis or shaft 35a of the rotary reflector 34a. The shutter in this instance is geared so as to revolve at a greater rate of speed than the rotary reflector and is so timed that it opens and closes with the movement of the faces 36a and the exposure is made while both the film and the reflecting face 36a are in motion but moving in unison.

What is claimed is:

1. A motion picture camera including a film chamber having an aperture past which a film is continuously moved, a rotary multi-faced reflector located in front of the aperture, a pair of fixed reflectors located at opposite sides of the aperture and reflecting against the rotary reflector, lens barrels in line with both of the fixed reflectors, a rockable guide frame, and an arcuate film guide on the frame holding the concave side of the film toward the aperture.

2. A motion picture camera including a film chamber having an aperture past which a film is continuously moved, a rotary multi-faced reflector located in front of the aperture, a pair of fixed reflectors located at opposite sides of the aperture and reflecting against the rotary reflector, lens barrels in line with both of the fixed reflectors, a rockable guide frame, an arcuate film guide on the frame holding the concave side of the film toward the aperture, a rotary shutter in front of the aperture comprising a disk having openings therein, and an annular flange on the disk disposed between the fixed and rotary reflectors and having openings therein.

3. A motion picture camera including a film chamber having an aperture past which a film is continuously moved, a rotary multi-faced reflector movable in front of the aperture, a stationary reflector reflecting on a rotary reflector, a lens barrel in line with the stationary reflector, a concave film guide back of the orifice holding the film in curved position with the concave portion thereof toward the orifice, and means for rocking the guide in synchronism with the turning movement of the rotary reflector.

4. A motion picture camera including a film chamber having an aperture past which a film is continuously moved, a rotary multi-faced reflector located in front of the aperture, a pair of fixed reflectors located at opposite sides of the aperture and reflecting against the rotary reflector, lens barrels in line with both of the fixed reflectors, a rockable guide frame, an arcuate film guide on the frame holding the concave side of the film toward the aperture, a rotary shutter in front of the aperture comprising a disk having openings therein, an annular flange on the disk disposed between the fixed and rotary reflectors and having openings therein, and manually operable means for moving the film, turning the rotary reflector, rocking the guide and turning the shutter in synchronism.

FRANK X. GRASER.